United States Patent [19]

Arai et al.

[11] Patent Number: 4,984,325
[45] Date of Patent: Jan. 15, 1991

[54] WINDSHIELD WIPER

[75] Inventors: Masaru Arai; Itsuro Saita, both of Yono, Japan

[73] Assignee: Nippon Wiperblade Co., Ltd., Yono, Japan

[21] Appl. No.: 432,877

[22] Filed: Nov. 7, 1989

[30] Foreign Application Priority Data

Nov. 15, 1988 [JP] Japan .......................... 63-148104[U]
Feb. 3, 1989 [JP] Japan ................................ 1-11415[U]
Feb. 9, 1989 [JP] Japan ................................ 1-13615[U]

[51] Int. Cl.⁵ .............................................. A47L 1/00
[52] U.S. Cl. .................................. 15/250.2; 15/250.35
[58] Field of Search ............. 15/250.2, 250.31, 250.34, 15/250.35, 250.42

[56] References Cited

U.S. PATENT DOCUMENTS 4,464,808  8/1984  Berry ................................ 15/250.42

FOREIGN PATENT DOCUMENTS 2495556  6/1982  France .............................. 15/250.35
2151465  7/1985  United Kingdom ............. 15/250.35

Primary Examiner—Timothy F. Simone
Assistant Examiner—Gary K. Graham
Attorney, Agent, or Firm—Wenderoth, Lind & Ponack

[57] ABSTRACT

A windshield wiper including an arm head rotatably connected to a stationary part of a vehicle, a main arm rotatively supported on the arm head and having a wiper blade thereon, and a sub-arm supporting a wing and being rotatively supported on the arm head. The axis of the rotative movement of the sub-arm and that of the main arm make an acute angle therebetween whereby a part of the air force acting on the wing is transmitted to the main arm as determined by a partial force defined by the acute angle.

11 Claims, 4 Drawing Sheets

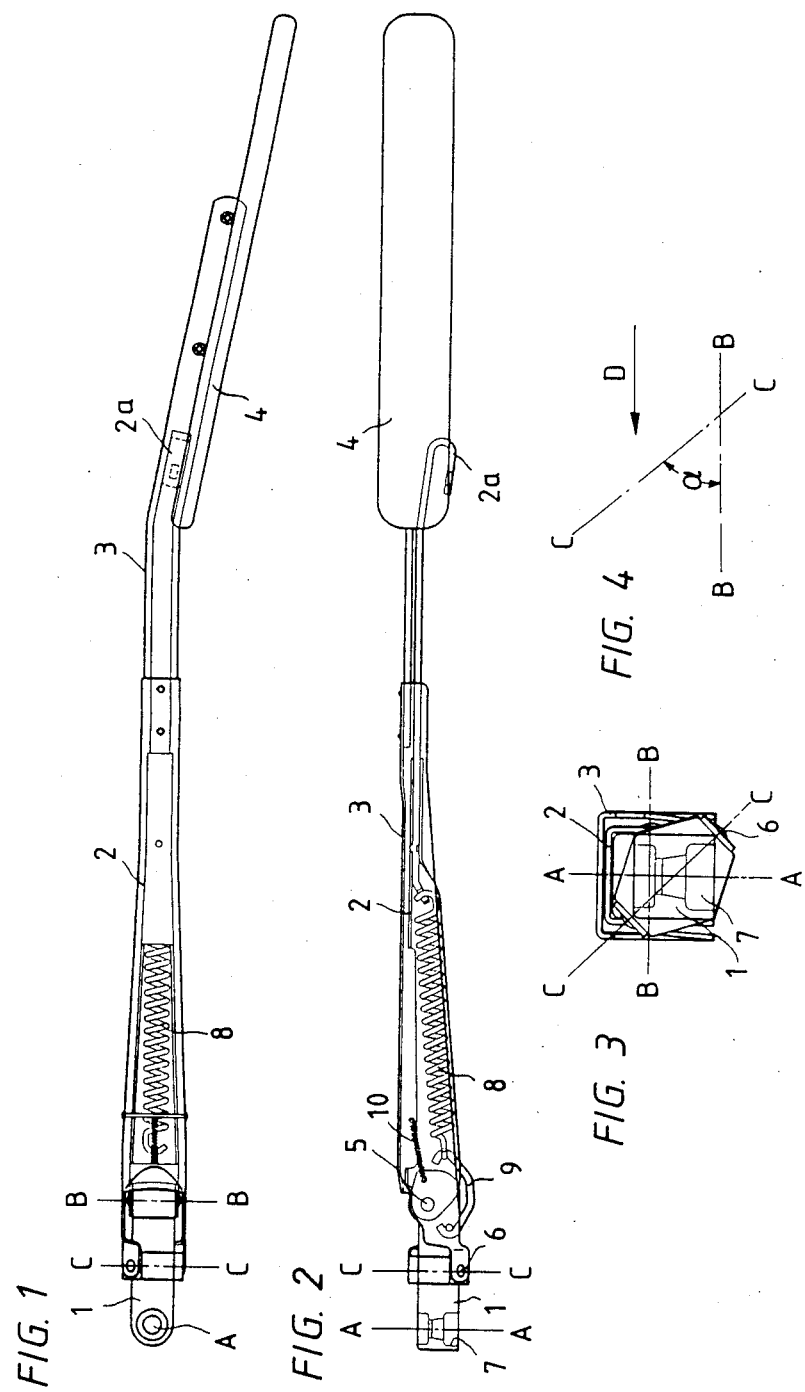

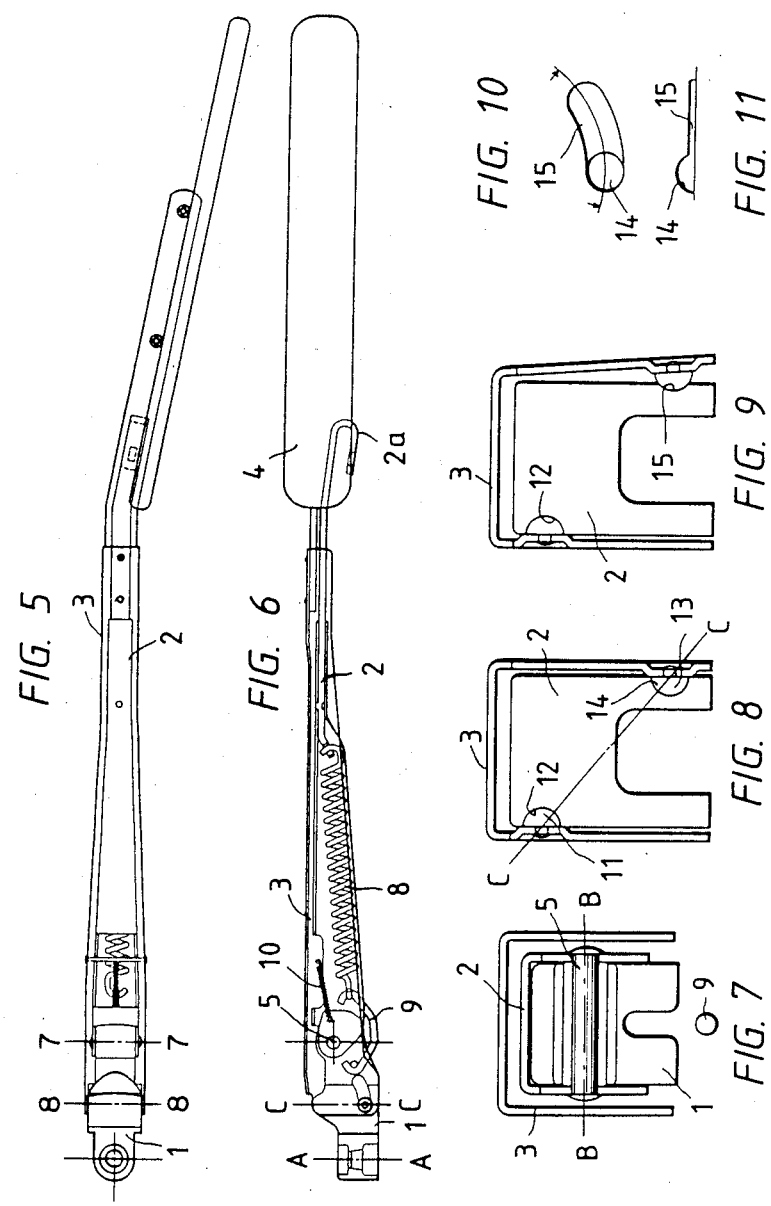

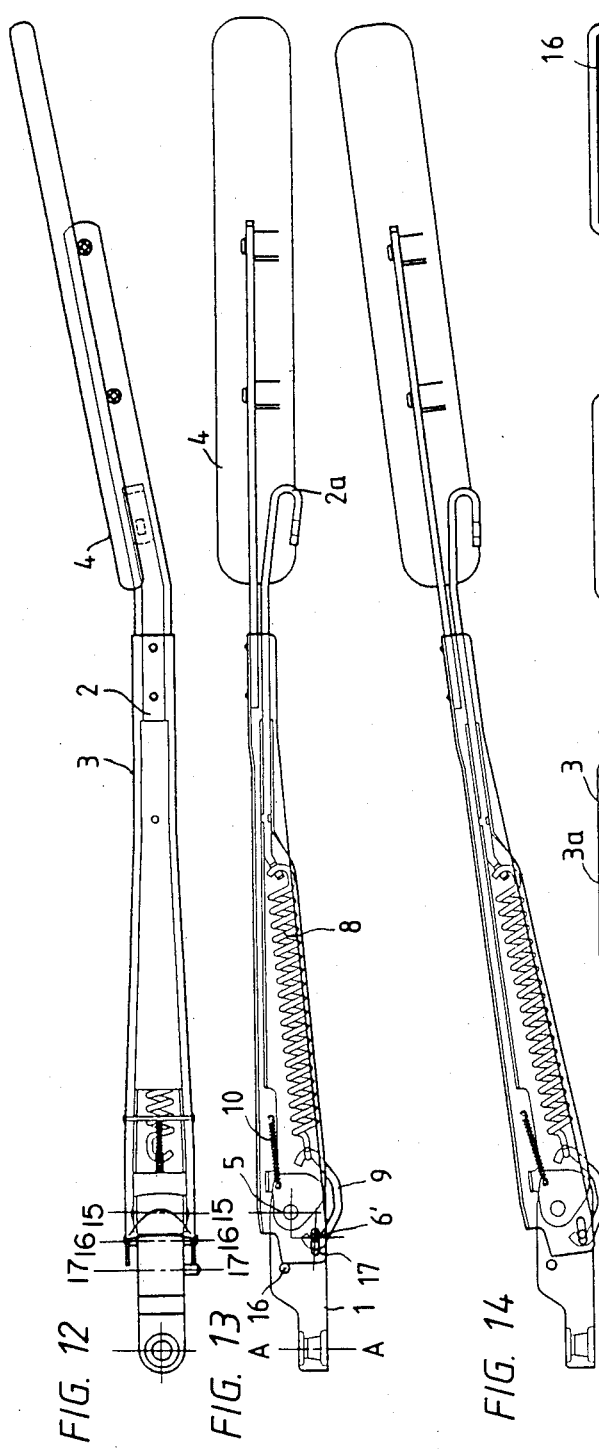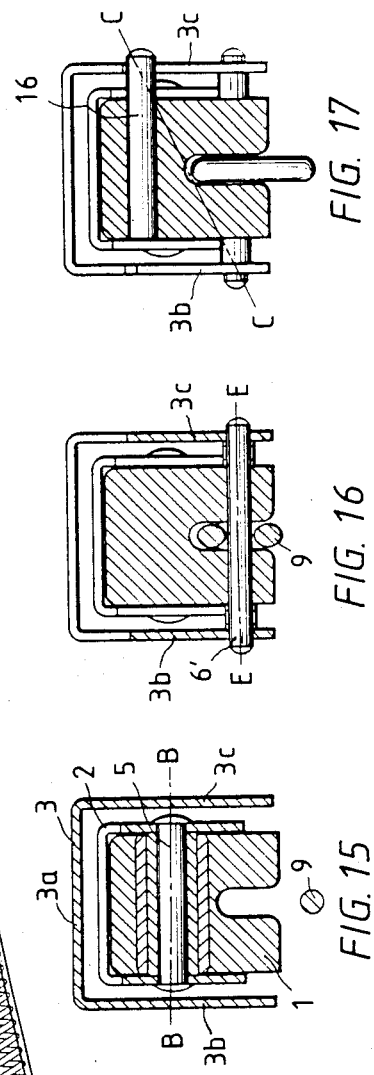

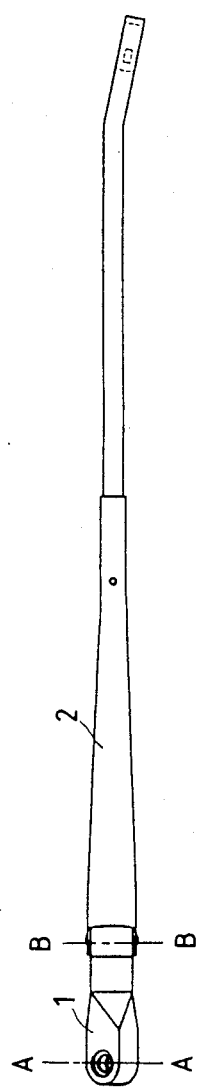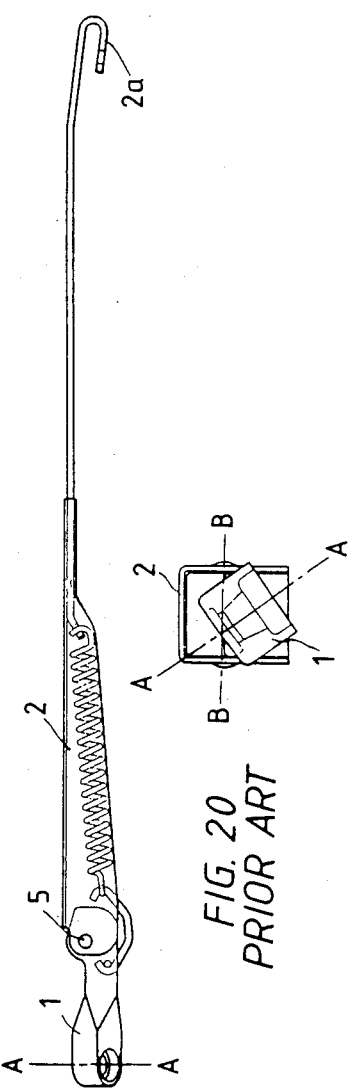
FIG. 18 PRIOR ART
FIG. 19 PRIOR ART
FIG. 20 PRIOR ART

WINDSHIELD WIPER

FIELD OF THE INVENTION

The present invention relates to a windshield wiper and, particularly to a windshield wiper having a device for preventing the lift up phenomenon or a pressure increasing device such as a wing.

DESCRIPTION OF PRIOR ART

In a windshield wiper for cleaning a windshield of a vehicle, when the vehicle runs at a high speed, the wiper tends to lift up from the surface of the windshield, which deteriorates the wiping property and, in the worst case, the wiperblade of the wiper device will separate from the glass surface and, as a result, the glass surface will be damaged. For preventing such lift up phenomenon various types of pressure increasing devices have been proposed. Such devices comprise a wing device, a pressure increasing actuator device with a control circuit therefor, and a wiper device having a twisted arm head and the like.

The wiper having a wing device has shortcomings such that the wing has a relatively large shape which increases the size and weight of the wiper device, the pressure is decreased by the wind in the reverse direction, and the visibility of the driver is reduced.

The wiper device having a pressure increasing actuator and an electronic control circuit is complicated in construction and is expensive.

FIG. 18 through FIG. 20 show one example of a prior art wiper device having a twisted arm head. In the drawings, an arm head 1 is mounted on a stationary part (not shown) of a vehicle and oscillates around an axis A—A, a wiper arm 2 is mounted on the arm head 1 and oscillates around an axis B—B. The axis A—A is skew to the axis B—B at an acute angle, while in usual wiper devices the axes A—A and B—B are skew orthogonally. The device makes it possible to utilize the air stream acting on the wiper arm 2 and on a wiperblade (not shown) so as to increase the pressing force. The device can effectively utilize the wind stream, but the friction force acting between the windshield surface and the blade rubber will also act to increase the pressing force, which increases further the friction force and tends to deteriorate the wiping property and to overload the wiper motor and the like. Further, the pressing force also decreases under the effect of wind in the reverse direction.

The present invention has been made in view of the circumstances aforementioned, and aims to provide a windshield wiper which can effectively utilize the wind acting on the wing.

SUMMARY OF THE INVENTION

According to the invention, there is provided a windshield wiper including an arm head rotatively connected to a stationary part of a vehicle, a main arm rotatively supported on the arm head and being connected to a wiper blade, a sub-arm supporting a wing and being rotatively supported on the arm head, characterized in that the axis of the oscillation of the sub-arm and that of the main arm make an acute angle therebetween whereby a part of the air force acting on the wing is transmitted to the main arm.

According to the invention, only the main arm acts when the vehicle is not moving, and a part of the air force acting on the wing is additionally applied on the wiperblade when the vehicle is running, so that the force acting on the wiperblade can reliably be controlled, and it is possible to maintain the wiping property and to avoid the overload on the wiper motor.

BRIEF DESCRIPTION OF THE DRAWINGS

Further objects and effects of the invention will become apparent from the following detailed description in conjunction with the drawings, in which:

FIG. 1 is a schematic plan view of a windshield wiper according to a first embodiment of the present invention with a wiperblade thereof being omitted;

FIG. 2 is a side view of the wiper of FIG. 1;

FIG. 3 is a schematic end view as viewed from the left end of FIG. 2;

FIG. 4 is a diagram showing the relationship between the air stream and the axes of rotative movement according to the first embodiment;

FIG. 5 is a schematic plan view similar to FIG. 1 but showing a second embodiment of the invention;

FIG. 6 is a schematic side view of FIG. 5;

FIG. 7 is a section taken along line 7—7 in FIG. 5;

FIG. 8 is a section taken along line 8—8 in FIG. 5;

FIG. 9 is a section similar to FIG. 8 but showing the condition when the wiper is in a rock back condition;

FIG. 10 is a schematic view showing a groove formed in a side surface of the arm head of the second embodiment;

FIG. 11 is a partial sectional view showing the depth of the groove of FIG. 10;

FIG. 12 is a schematic plan view of a third embodiment of the present invention;

FIG. 13 is a schematic side view of FIG. 12;

FIG. 14 is a view similar to FIG. 13 but showing the condition when the wiper is moving into a rock back condition;

FIG. 15 is a sectional view taken generally along line 15—15 in FIG. 12;

FIG. 16 is a sectional view taken generally along line 16—16 in FIG. 12;

FIG. 17 is a sectional view taken generally along line 17—17 in FIG. 12;

FIG. 18 is a schematic plan view showing a prior art windshield wiper with the wiperblade thereof being omitted;

FIG. 19 is a schematic side view of FIG. 18, and

FIG. 20 is a graph showing the relationship between the rotation of the wiper arm and the arm head according to the prior art.

DETAILED DESCRIPTION OF PREFERRED EMBODIMENTS

The first embodiment according to the invention shown in FIGS. 1 through 3 comprises an arm head 1 which is adapted to be mounted on a stationary part (not shown) of a vehicle and is reciprocatingly rotatable around the axis A—A, a main arm 2 rotatively mounted on the arm head 1 around the axis B—B with a wiperblade (not shown) being mounted on a tip end 2a, a sub-arm 3 supporting a wing 4 and being rotatively mounted on the arm head 1 around the axis C—C, a pivot pin 5 between the arm head 1 and the main arm 2 and defining the axis B—B, a pivot pin 6 between the arm head 1 and the sub-arm 3 and defining the axis C—C, and a main spring 8 acting between the arm head 1 and the main arm 2 through a hook 9. The sub-arm 3 has a generally inverted U-shape or a channel like shape and overlaps the main arm 2 of the similar cross section.

As shown in FIGS. 3 and 4, the skew axes B—B and C—C define an acute angle $\alpha$ therebetween when viewed in elevation, and thus, a partial force of the aerodynamic force acting on the wing 4 acts on the main arm 2 in vertical downward direction. The wing 4 may have a vertical wind receiving surface which is perpendicular to the windshield surface and opposed to the direction D of the wind pressure as the vehicle moves through the air, so that the interference with the visible field of the driver of the vehicle can be minimized. But the wing 4 may also have an inclined surface.

In assuming that the angle between axes B—B and C—C is $\alpha$, the force acting on the wing 4 is F and the pressing force transmitted to the main arm 2 from the sub-arm 3 is P, then, $P = F \cdot \sin\alpha \cdot \cos\alpha$ Shown at 10 in FIG. 2 is a sub-spring acting between the main arm 2 and the sub-arm 3 to prevent the sub-arm 3 from separating from the main arm 2. In particular, a wind pressure in the reverse direction may sometimes push up the sub-arm if the sub-spring 10 is not provided.

FIG. 5 through FIG. 11 show the second embodiment of the invention which is generally similar to the embodiment of FIGS. 1 through 3 and corresponding parts are denoted by the same reference numerals, and the description thereof is omitted. The main arm 2 is mounted on the arm head 1 through the pivot pin 5 and is rotative around the axis lying along section line 7—7 similar to the first embodiment. But, the sub-arm 3 is mounted on the arm head 1 through two ball joint like connecting portions consisting of a semi-spherical projection 11 on the sub-arm 3 and a semi-spherical recess 12 in the upper left (FIG. 8) portion in the arm head 1, and a semi-spherical projection 13 on the sub-arm 3 and a semi-spherical recess 14 in the lower right (FIG. 8) portion in the arm head 1. These connecting portions constitute ball joints and define the axis C—C which makes the angle $\alpha$ similar to the first embodiment.

The operation, in particular, the force transmitting function of the second embodiment is the same as that of the first embodiment.

The spherical recess 14 is connected to a circular groove 15 of shallow depth as compared to recess 14 as shown in FIGS. 6, 10 and 11 which enables the spherical projection 13 to move along the groove 15 when the main arm 2 moves to the rock back condition so that the sub-arm 3 will easily and smoothly follow the movement of the main arm 2.

FIG. 12 through FIG. 17 show the third embodiment of the invention which is generally similar to the first and second embodiments and corresponding parts are denoted by the same reference numerals.

The left (FIG. 16) side of the sub-arm 3 is pivotably supported on a pivot pin 6' which is mounted on the arm head 1 and acts to support the hook 9, but the right side of the sub-arm 3 has an elongated opening 17 for receiving the pivot pin 6' as shown in FIG. 13. Further, a projection 16 is formed on the right side surface of the arm head 1 so as to abut the rear upper end of the sub-arm 3 during the normal operating condition. The abutting portion between the projection 16 and the sub-arm 3 and the left end portion of the pivot pin 6' act to define the axis C—C as shown in FIG. 17 which makes the angle $\alpha$ to the axis B—B defined by the pivot pin 5, thereby the force acting on the wing 4 is transmitted to the main arm 2 similar to preceding embodiments.

When the main arm 2 moves to the rock back condition as shown in FIG. 14, the rear end of the sub-arm 3 separates from the projection 16 so that the sub-arm 3 rotatively moves around the pivot pin 6' which is parallel to the pivot pin 5. Thus, the rock back movement of the sub-arm 3 is smooth and easy.

As described heretofore, according to the invention, only the main arm acts when the vehicle is not moving, and a portion of the air force acting on the wing is applied additionally on the main arm to increase the pressing force when the vehicle is running, thus, the force acting on the wiperblade can be reliably controlled, and it is possible to maintain the wiping characteristics reliably and to avoid excessive load on the wiper motor.

Although the various aspects of the present invention have been described with respect to its preferred embodiments, it will be understood that the invention is not limited to the embodiments and is entitled to cover within the full scope of the appended claims.

We claim:

1. A windshield wiper mechanism including an arm head adapted to be rotatably connected to a stationary part of a vehicle, a main arm having one end rotatively supported on the arm head for rotation around a first axis of rotation and adapted to have a wiper blade mounted on the other end thereof, a sub-arm having a wing supported thereon and being rotatively supported on said arm head for rotation around a second axis of rotation, said wing having a surface defining a plane, said sub-arm overlying and abutting said main arm so that the second axis of rotation defines with respect to the first axis of rotation an acute angle positioned such that with respect to the plane of the wing part of the force of air acting on the wing as a vehicle on which said wiper mechanism is mounted moves through air is transmitted to the main arm.

2. A windshield wiper according to claim 1, wherein said wing has a wind receiving surface extending substantially orthogonally to the surface of a windshield of a vehicle on which said mechanism is mounted.

3. A windshield wiper according to claim 1, wherein said wing has a generally flat wind receiving surface which is inclined in the rear and upward direction.

4. A windshield wiper according to claim 1, further comprising a sub-spring provided between the main arm and the sub-arm to prevent separation of said main arm and said sub-arm.

5. A windshield wiper according to claim 1, wherein a main portion of the sub-arm has a generally inverted U-shaped or a channel like cross section and substantially overlies the main arm.

6. A windshield wiper according to claim 5, further comprising a pivot pin mounted on the arm head to rotatively mount the main arm and another pivot pin mounted on the arm head to rotatively mount the sub-arm, said pivot pins defining the acute angle therebetween.

7. A windshield wiper according to claim 5, wherein pivot portions are provided respectively between the opposite side portions of the rear end portion of the sub-arm and corresponding side surfaces of the arm head, said pivot portions defining said second axis of rotation.

8. A windshield wiper according to claim 7, wherein said pivot portions respectively comprise semi-spherical recesses formed in the side surfaces of the arm head and semi-spherical projections formed on the sub-arm engaged in said recesses.

9. A windshield wiper according to claim 8, wherein one of said semi-spherical recesses in the arm head is continued as a shallow groove extending along a circular arc.

10. A windshield wiper according to claim 5, further comprising a pivot pin mounted on the arm head to rotatively mount the main arm, another pivot pin also mounted on the arm head which passes through an elongated opening in one side of the sub-arm and through a circular opening in the other side of the sub-arm, the rear end of said one side of the sub-arm engaging normally with a stop or a projection formed on the arm head, said engagement between the stop and the sub-arm and the circular opening in said the other side of the sub-arm defining said second axis of rotation.

11. A windshield wiper according to claim 10, wherein when the pivot pin between the arm head and the sub-arm takes the position near to one end of the elongated opening said second axis of rotation is parallel to said first axis of rotation and, when the pivot pin takes the position near to the other end of the elongated opening said first and second axes of rotation are at an acute angle.

* * * * *